June 2, 1953 W. G. HOELSCHER 2,640,369
FEEDBOX TRANSMISSION FOR LATHES
Filed Sept. 8, 1948 7 Sheets-Sheet 1

INVENTOR.
William G. Hoelscher
BY
Wood, Arey, Herron & Evans
ATTORNEYS.

June 2, 1953 W. G. HOELSCHER 2,640,369
FEEDBOX TRANSMISSION FOR LATHES
Filed Sept. 8, 1948 7 Sheets-Sheet 4

INVENTOR.
William G. Hoelscher
BY
Wood, Arey, Herron & Evans
ATTORNEYS.

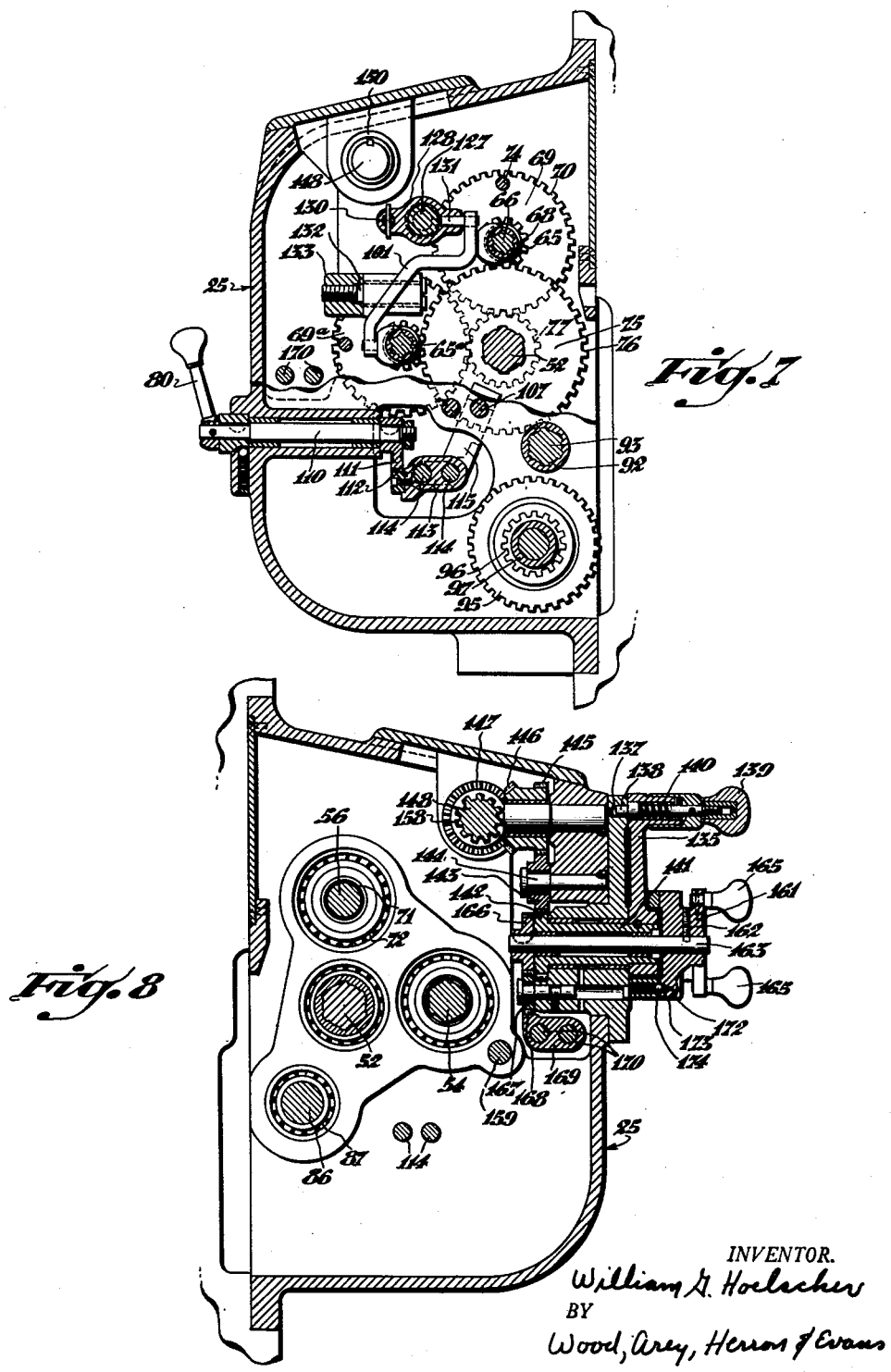

June 2, 1953 W. G. HOELSCHER 2,640,369
FEEDBOX TRANSMISSION FOR LATHES
Filed Sept. 8, 1948 7 Sheets-Sheet 6

INVENTOR.
William G. Hoelscher
BY
Wood, Arey, Herron & Evans
ATTORNEYS.

June 2, 1953  W. G. HOELSCHER  2,640,369
FEEDBOX TRANSMISSION FOR LATHES
Filed Sept. 8, 1948  7 Sheets-Sheet 7

INVENTOR.
William G. Hoelscher
BY
Wood, Arey, Herron & Evans
ATTORNEYS.

Patented June 2, 1953

2,640,369

UNITED STATES PATENT OFFICE 2,640,369

FEEDBOX TRANSMISSION FOR LATHES

William G. Hoelscher, Cincinnati, Ohio, assignor to The American Tool Works Company, Cincinnati, Ohio, a corporation of Ohio Application September 8, 1948, Serial No. 48,244

3 Claims. (Cl. 74—348)

1

This invention relates generally to lathes and is particularly directed to improvements in the structure of the variable speed feed box which determines the longitudinal feed rate of the lathe carriage. The present structure is of the tumbler gear type which embodies a cone of multiple diameter speed gears and a tumbler unit which may be shifted both longitudinally and transversely in an arc to establish a meshing engagement with the selected cone gear. A feed box of this nature is disclosed in the prior patent of William G. Hoelscher, No. 1,982,612, issued November 27, 1934. The present feed box follows generally the principles disclosed in the prior patent and is designed to provide a simplified structure which provides improved performance and easier, more convenient selectivity.

In general, the feed box is of the invertible drive type by means of which two separate speed ranges are provided by a simple change in the gear train so that the feed box may selectively be converted either for cutting threads according to the American standard system or according to the metric system. This conversion is accomplished by the use of a detachable input gear which may be selectively placed on either of a pair of shafts so that in one instance the input drive is from the tumbler unit to the cone gears and in the second instance from the cone gears to the tumbler unit. This arrangement provides a dual set of speeds, utilizing the same gears in both instances by reason of the fact that when the drive is inverted or transposed, the ratio of the drive to the driven gears likewise is inverted. In the present disclosure, the cone gear and tumbler provides ten speeds and the transmission additionally is equipped with two secondary range adjustment gear sets, one of which provides two range changes and the other three. The transmission thus provides sixty feed rates for the various American standard threads and sixty feed rates for metric threads. Power from the feed box is transmitted selectively either to a feed rod or to a lead screw which extends from the feed box lengthwise of the lathe bed. The carriage is arranged to be actuated selectively by the rod or lead screw according to the type of work.

The tumbler unit constitutes a swinging member which is slidably splined upon one of the transmission shafts and carries a gear at its swinging end adapted to mesh with the selected gear of the cone. The unit is adjusted by means of two manual selector devices. One of these shifts the unit longitudinally relative to the gear

2 cone for alignment with the selected gear, and the other swings the tumbler in an arc relative to the shaft for meshing it with the selected gear.

One of the primary objects of the present invention has been to provide a simplified actuating mechanism for the tumbler unit which permits the tumbler to be shifted relative to its component gear cone smoothly, quickly and with very little resistance. For this purpose the tumbler unit is maintained in a vertical position relative to its mounting shaft, substantially in balance so that its swinging movements are virtually unaffected by gravity, thus providing exceptional ease of adjustment. The tumbler unit is provided with teeth slidably meshing directly with a rotatable toothed shaft or elongated gear so that intermediate parts are eliminated and lost motion due to wear is greatly reduced. By providing a yoke connection to the tumbler closely related to the shaft upon which the tumbler unit is translated longitudinally and opposite to its toothed end, frictional losses and the tendency for the unit to bind relative to its mounting shaft is avoided, thereby improving the slidability of the unit, providing ease and accuracy of adjustment.

Another object has been to provide a simplified structure to permit changing the range of speeds provided by the cone and tumbler unit by the use of independently shiftable range shift gears and control levers such that the various ranges may be selected by actuating either or both levers to select directly the desired range without progressing through the entire series of ranges. This provides greater speed in selection and avoids the difficulty of meshing and unmeshing a series of gears to reach the desired combination.

Still another object has been to provide simplified and direct acting control apparatus for shifting the secondary range adjustment gears and an improved selector to couple the feed rod and lead screw to the feed box gear train.

Further objects and salient features of the invention are more fully disclosed in the following detailed description with reference to the drawings which disclose a preferred embodiment of the invention.

Figure 3:
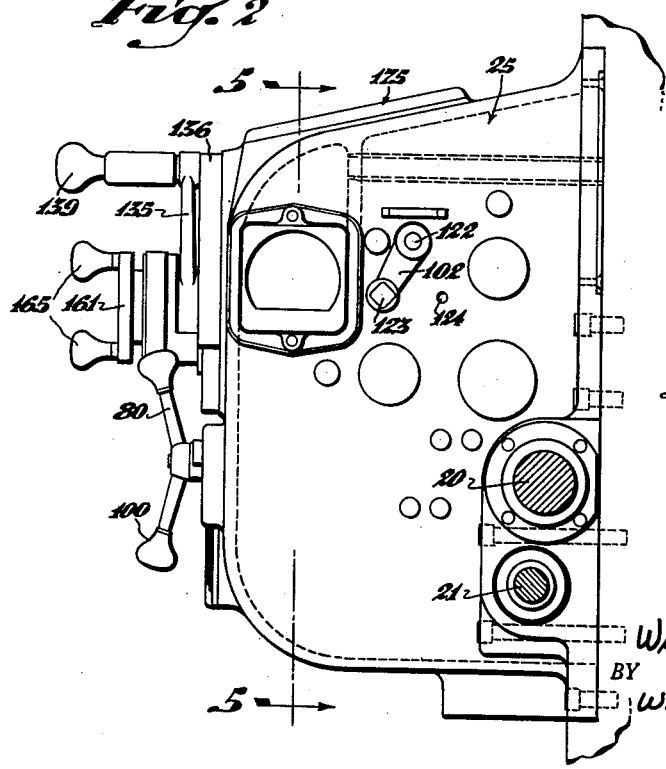
Figure 3 is an end view further illustrating the general arrangement of the feed control unit.
Figure 4:
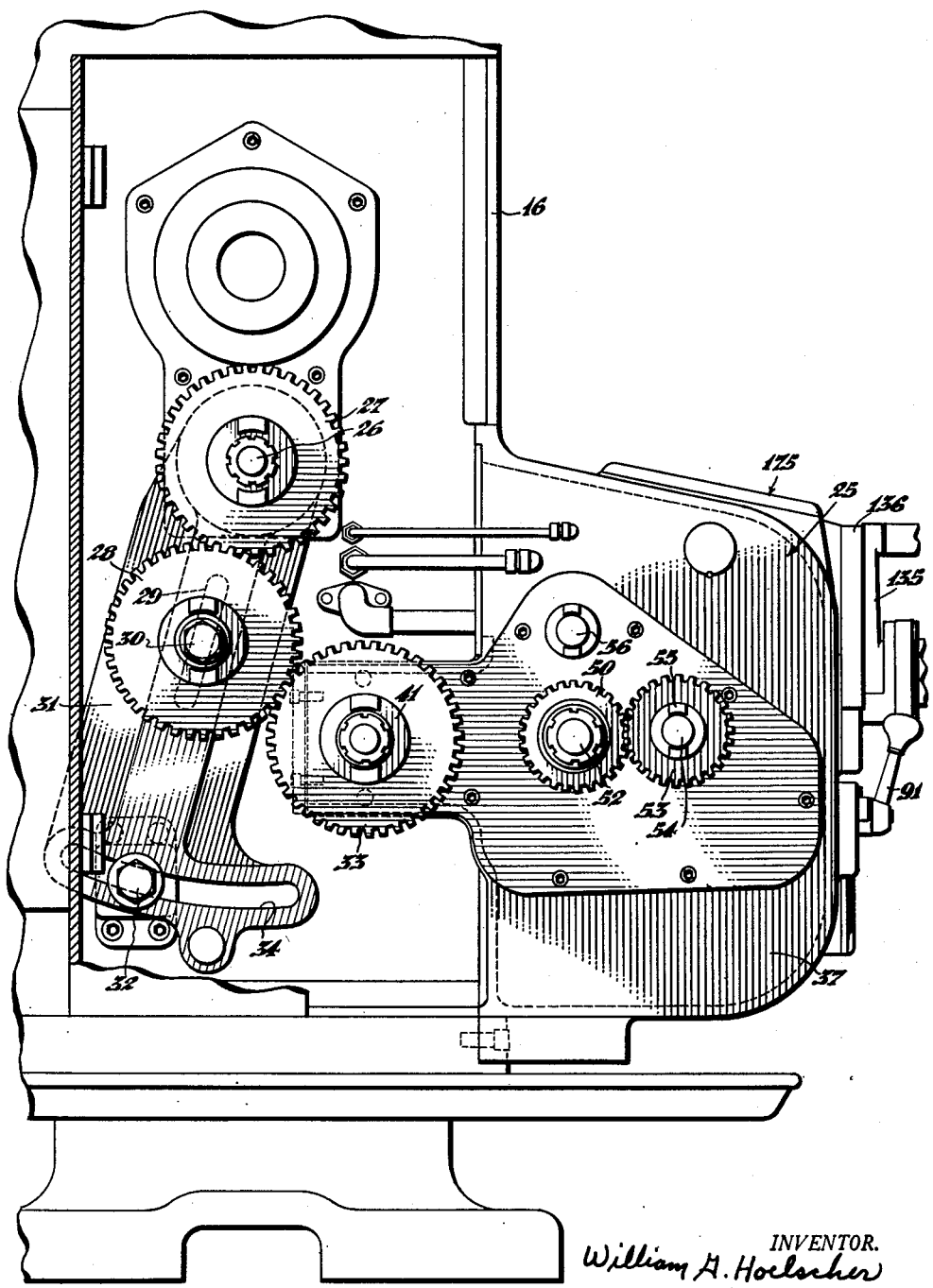

Figure 4 discloses the unit as viewed from the end opposite to that shown in Figure 3, illustrating the gear train by which the power is transmitted from the head stock to the feed control unit.

Figure 5:
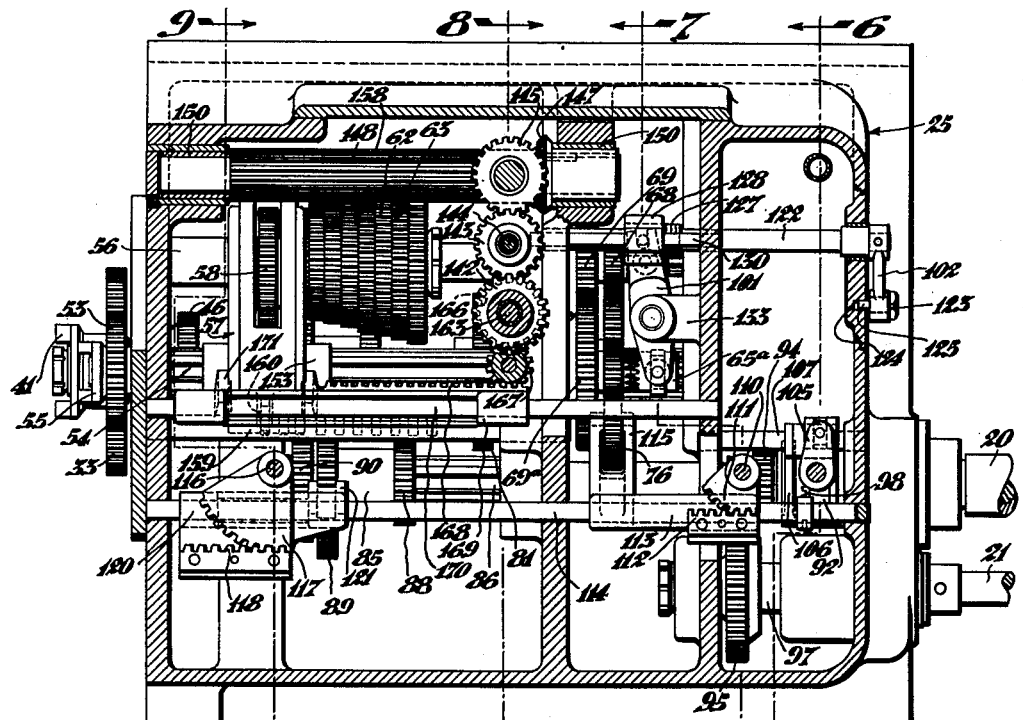

Figure 5 is a sectional view taken on line 5—5, Figure 3, illustrating generally the gear train and speed change apparatus of the control unit.

Figure 6:
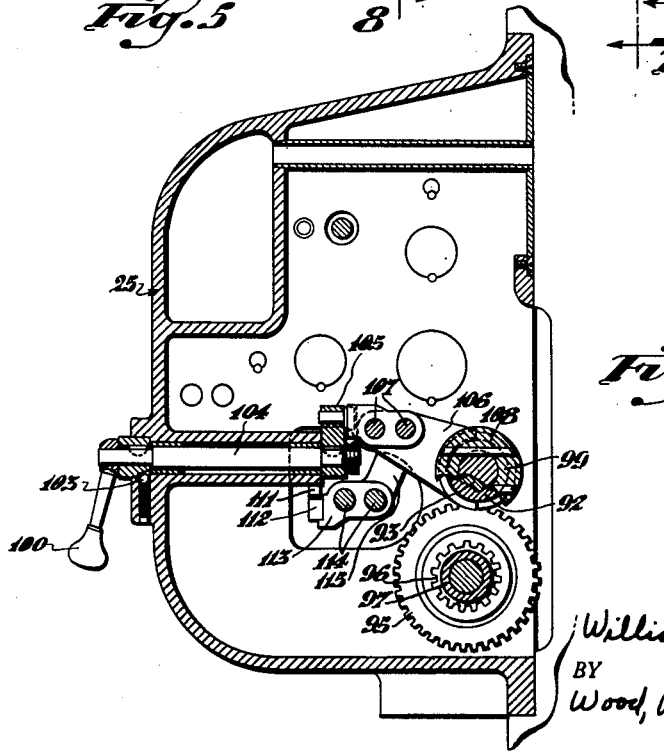

Figure 6 is a sectional view taken on line 6—6, Figure 5, detailing the shifter mechanism for selectively coupling the feed rod or lead screw to the feed box gear train.

Figure 7 is a sectional view taken on line 7—7, Figure 5, detailing the shifter mechanism for one of the range selectors.

Figure 8 is a sectional view taken on line 8—8, Figure 5, detailing the control mechanism for the tumbler gear unit.

Figure 9:
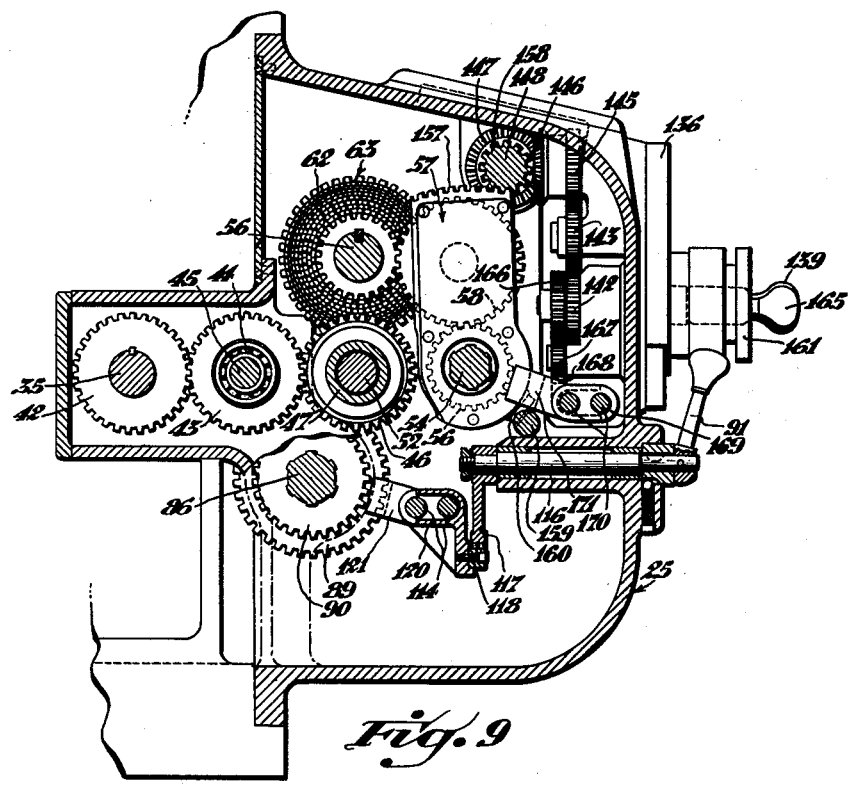

Figure 9 is a sectional view taken on line 9—9, Figure 5, further illustrating the structure and arrangement of the speed change tumbler and its actuating mechanism.

Figure 10:
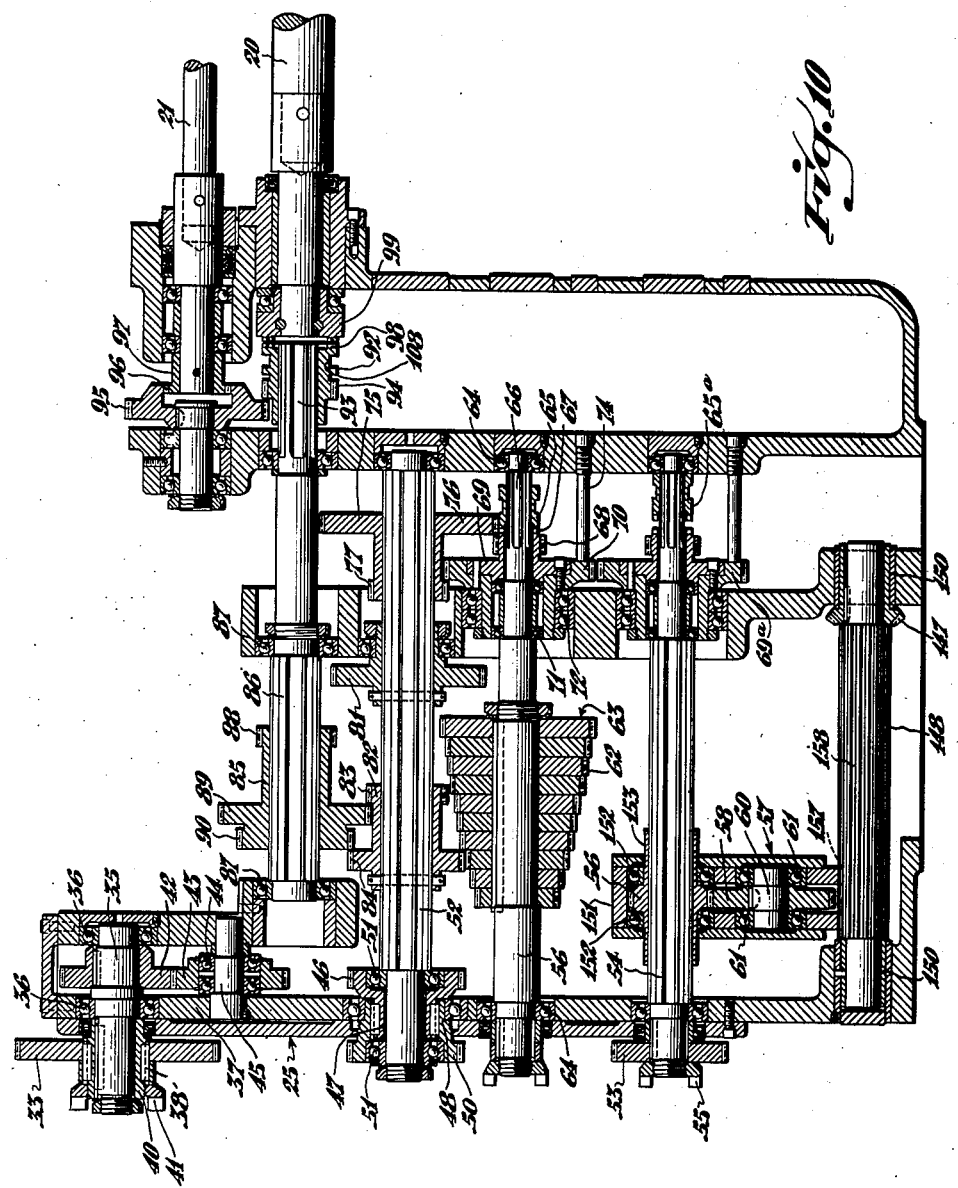

Figure 10 is a general layout of the speed change gearing with the various shafts and gears shown in a common plane for convenience of illustration, with the shiftable gears in a neutral position and the transmission system set up for speed ranges suitable for the American standard threads.

Figure 11:
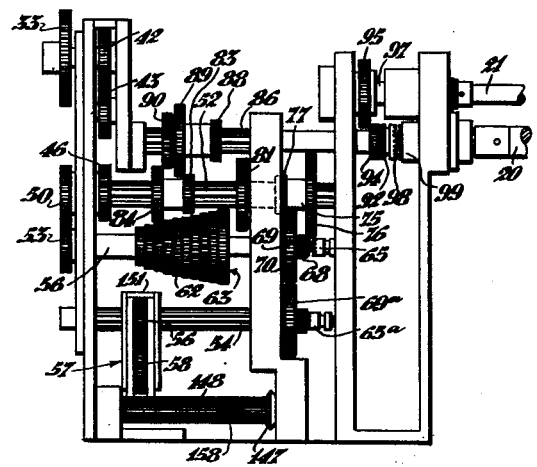

Figure 11 is a diagrammatic view illustrating a development of the gear train similar to that shown in Figure 10, but showing the detachable input gear shifted to a position for operating the driving transmission at speeds suitable for metric threads.

Figure 1:
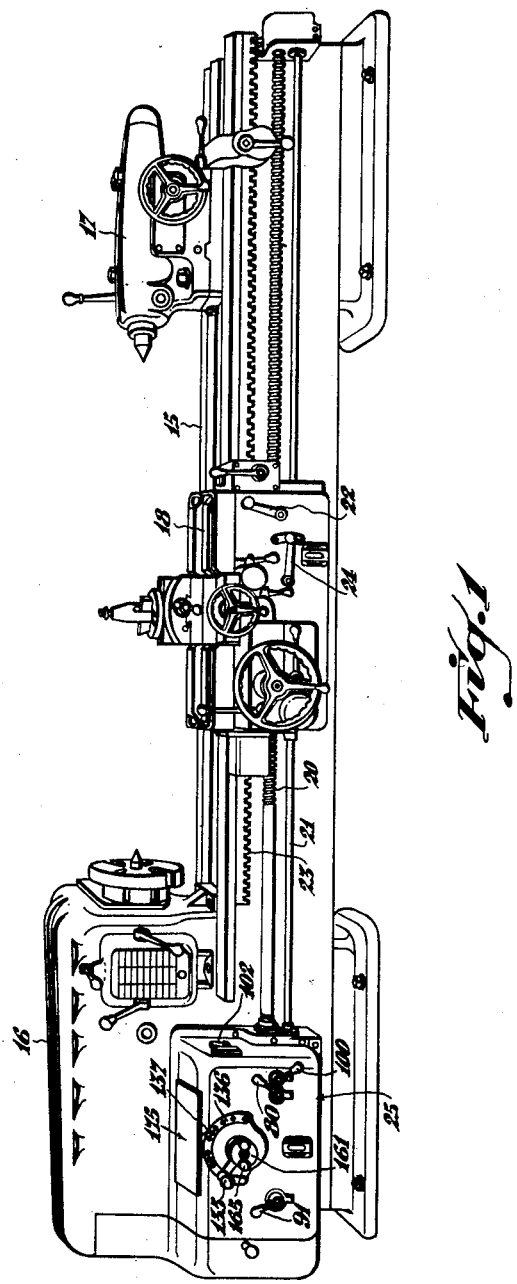
Figure 1 is a general elevation illustrating a lathe equipped with improved feed control unit.

Referring to Figure 1, which illustrates a lathe equipped with the present feed box structure, the assembly embodies a lathe bed 15 having a head stock 16 and a tail stock 17. A carriage 18 is slidably mounted on the bed and a lead screw 20 and feed rod 21 extend along the front of the bed in the usual manner, in driving connection with the carriage. For this purpose the carriage is equipped with a split nut, engageable by means of the lever 22, with the lead screw 20. The carriage includes also a gear train which is keyed or splined connection with the feed rod 21 and in driving connection with the rack 23 which is secured to the upper portion of the bed. A control lever 24 is in operating connection with the gear train to drive the carriage in either direction by power from the feed rod. The feed rod and lead screw are selectively driven by means of the feed box indicated generally at 25 which is mounted upon the head stock 16. The feed box is provided with a gear train having shiftable gears by means of which the speed of the lead screw or feed rod may be controlled.

Described generally with reference to Figure 4, the feed box is driven by means of a set of gears at the rearward end of the head stock so that carriage speed is correlated to spindle speed. Since the head stock forms no part of this invention, the details of its construction are omitted except so much of it as is necessary to drive the feed box. As shown, the head stock transmission includes a shaft 26 which extends beyond the end wall of the head stock. A gear 27 is keyed to this shaft and meshes with an idler gear 28 loosely journalled on a stub shaft 30, fixed upon a swinging quadrant 31 which is locked by means of a bolt 32. Gear 28 meshes with a gear 33 which forms a part of the feed box gear train. The quadrant is rotatably mounted on the shaft 26 and its lower end includes a slot 34 which is traversed by the bolt 32. The shaft 30 of idler gear 28 preferably is fixed in a slot 29 to permit the shaft 30 to be shifted relative to the quadrant in order to change gear 28 for speed variation.

*Arrangement of gear train*

As illustrated in Figure 10, gear 33, which is driven by the head stock transmission, is mounted upon a shaft 35 which is journalled on ball bearings 36—36 mounted in the end wall 37 of the feed box 25. The gear is keyed as at 38 to a sleeve 40 which is keyed to shaft 35, and is secured against displacement by means of a nut 41 which is screwthreaded to the sleeve 40. A gear 42 is keyed upon the inner end of shaft 35 and gear 42 meshes with an idler gear 43 journalled on ball bearings 44 upon a stub shaft 45. Gear 43 meshes with a gear 46 which includes a sleeve 47. A sleeve 48 is telescopically engaged over and keyed to sleeve 47 and includes a gear 50 which is disposed to the outside of casing 25. Gears 46 and 50 are loosely journalled on bearings 51 mounted upon the bearing end of splined shaft 52 so that the gears rotate loosely as a unit relative to the shaft.

As shown in Figure 10, in which the unit is arranged for American standard thread feeds, gear 50 meshes with gear 53 which is keyed to the end of splined shaft 54. It is to be noted at this point that gear 53 is detachably mounted upon shaft 54 by means of the nut 55 so that gear 53 may be detached and placed upon the end of shaft 56 to convert the transmission for metric thread feeds as hereinafter described.

The drive from gear 53 is transmitted to shaft 54 and to gear 56 which is slidably splined to shaft 54 and forms part of the shiftable tumbler unit indicated generally at 57. Gear 56 meshes with a gear 58 which is carried upon a stub shaft 60 mounted on ball bearing 61 formed in the swinging end of the tumbler unit 57. As shown in Figure 9, gear 58 is adapted to mesh selectively with any one of the gears 62 of the cone of gears generally indicated at 63. These gears are keyed to shaft 56 which is loosely journalled upon ball bearings 64 mounted in the opposite end walls of the feed box. Shaft 56 includes a shiftable clutch element 65 which is slidably engaged upon the splined end 66 of the shaft. The teeth 67 of clutch element 65 mesh with cooperating teeth formed on the end of a pinion 68 as a part of compound gear 69, which includes a gear 70. The compound gear is journalled upon ball bearings 71 and 72 mounted respectively in the casing wall and on shaft 56, so that the unit is free to rotate relative to the shaft 56. This gear and pinion unit is held against endwise displacement by means of a shoulder screw 74 engaged in the end wall of the casing, with its inner end in abutment with the face of gear 70. The pinion 68 and gear 70 are adapted to establish a driving connection selectively with a shiftable compound gear and pinion unit 75 slidably mounted upon the splined shaft 52. When the unit is shifted to the left, the gear 76 of the unit meshes with pinion 68 and when the unit is shifted to the right, the pinion 77 meshes with gear 70. The shiftable gear and pinion 75 is shifted by means of a range control lever 80 at the front of casing 25 (Figure 2), as hereinafter described in greater detail.

Figure 2:
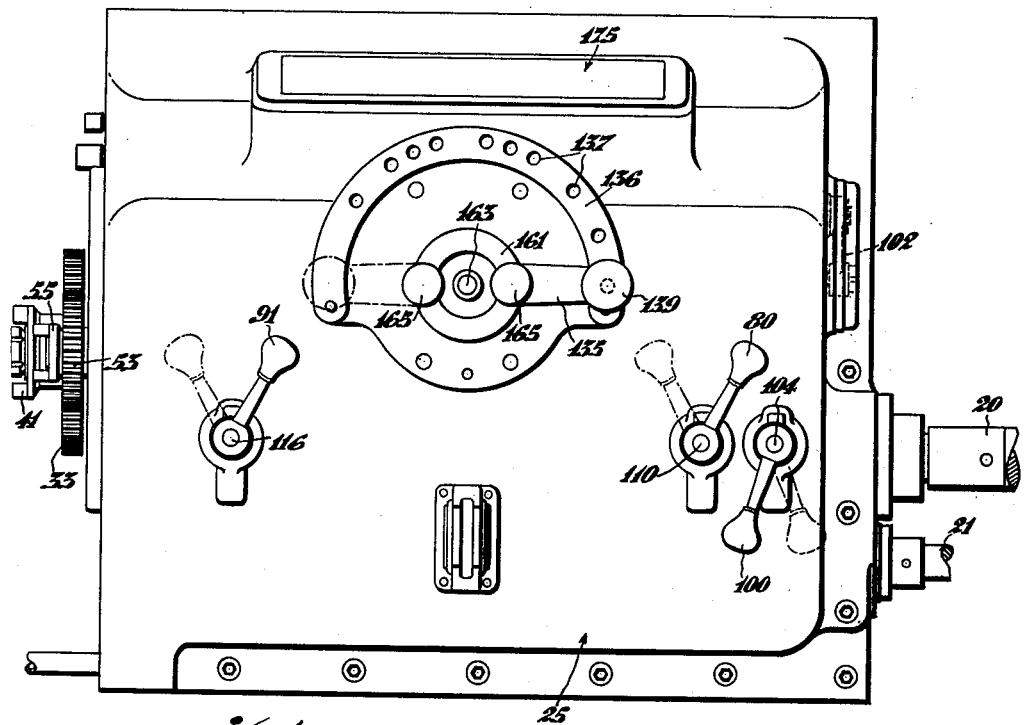
Figure 2 is an enlarged side elevation of the feed control unit illustrating the various control levers associated therewith.

Upon splined shaft 52 is pinned a gear 81 and compound gear 82 having a pinion 83 and a gear 84. A mating compound gear 85 is slidably mounted upon a splined shaft 86 which is journalled in ball bearings 82. Compound gear 85 includes a pinion 88 adapted to mesh with gear 81, a gear 89 adapted to mesh with pinion 83 and a gear 90 adapted to mesh with gear 84 to provide a selection of three speed ranges in addition to the two speed ranges provided by the compound gear 75 noted above. Compound gear 85 is shifted by means of a three position actuating lever 91 mounted on the feed box as shown in Figure 2. From the shaft 86, the drive is transmitted either to the lead screw 20 or the feed rod 21. For this purpose a slidable pinion and clutch unit 92 is carried upon the splined end 93 of shaft 86. A pinion 94 of this unit is adapted to mesh with a gear 95 having clutch teeth 96 engaged with the teeth of a collar 97 which is pinned to the feed rod 21. The clutch teeth 98 of the unit 92 are engageable with clutch teeth formed on a collar 99 which is pinned to the end of the lead screw 20. Clutch unit 92 is shifted by means of a control lever 100 journalled in the feed box adjacent lever 80. It will be apparent that this arrangement provides for establishing a selective driving connection either with the lead screw 20 or with the feed rod 21 depending upon the position of lever 100.

In summary, the gear train is established from gears 33 and 42 to idler gear 43 which meshes with gear 46 to drive the component gear 50, which meshes with the gear 53. Gear 53 drives shaft 54 and gears 56 and 58 of the tumbler unit to transmit the drive to the gears 62 of the cone 63. Rotation of the gears 62 is transmitted through shaft 56 to clutch unit 65, to pinion 68 and gear 70 of compound gear 69, to the shiftable compound gear 75 on shaft 52. From shaft 52 the power is transmitted to shaft 86 by means of the shiftable compound gear unit 85 and from the splined end of shaft 86 either to the lead screw or to the feed rod.

*Inverse gear train*

When the feed box is converted to metric operation, the gear 53 is removed from shaft 54 and placed upon shaft 56 as shown in Figure 11. In this instance the drive is established from gear 33 to gear 42 to idler 43 to the component gears 46 and 50. Gear 50 meshes with gear 53 which is now keyed directly to shaft 56 to drive the cone 63. From cone 63, the power is transmitted through the tumbler unit 57 to shaft 54 instead of driving from the tumbler to cone 63 as previously described. This changes the entire gear ratio since the cone gears which previously were driven now become the driving gears. It is to be noted at this point that the end of shaft 54 includes a loosely journalled compound gear unit 69a, duplicating compound gear 69, and including a shiftable clutch collar 65a similar to the clutch collar 65 above described. These respective clutch collars are connected to a shifter 101 which is operated by a selector lever 102 (Figure 5). When the feed box is converted into metric operation, lever 102 is shifted from the position shown in Figure 5 so that the position of the clutch collars is reversed.

As shown in Figure 7, the shiftable compound gear 75 is arranged to mesh both with the compound gear 69, and 69a. Thus, when the compound gear 69a is coupled to shaft 54, compound gear 69 will idle and the drive will be transmitted from shaft 54 to shaft 52 by the shiftable compound gear 75. It will be apparent therefore, that the shiftable compound gears 75 and 85 operate in the same manner when the drive is inverted so that six range changes may be made by shifting the levers 80 and 91. From the shaft 86 power is transmitted to the lead screw and feed rod in the same manner as previously described.

From the foregoing, it will be observed that with the transposable input gear 53 in the position shown in Figure 10, the power is transmitted from the tumbler unit 57 to the cone 63 while in the position shown in Figure 11, the power is transmitted from the cone to the tumbler unit, thus alternating the drive so that an entirely new series of speed ranges is established.

*Control linkage for the range control levers and selector lever*

As shown in Figures 5 and 6, the apparatus for coupling the lead screw or feed rod to the feed box is actuated by the previously noted selector lever 100. This lever includes a detent 103 to latch it in its selected positions. The lever is keyed to shaft 104 journalled in the feed box casing and having a shifter lever 105 keyed to its inner end. A shifter fork 106 is slidably mounted upon rods 107—107 and has its inner end pivotally connected to lever 105. The outer end of fork 106 engages a groove 108 (Figure 10) formed in the clutch and pinion unit 92. Thus, the lever in one position couples the clutch teeth to the lead screw, while in its second position the gear 94 meshes with gear 95 to drive the feed rod with the lead screw clutch teeth disengaged. The movement limits of this lever are indicated in Figure 2.

The range selector lever 80 is illustrated in Figures 5 and 7. As shown in Figure 7, the lever is secured upon the end of shaft 110 journalled in the feed box casing and following the construction of lever 100 previously disclosed. To the inner end of shaft 110 is keyed a gear segment 111 meshing with a rack 112. Rack 112 is secured to a slider 113 which is slidably mounted upon the rods 114—114. A yoke 115 extends upwardly from slider 113 and engages the opposite sides of the gear 76 of compound gear 75. Swinging movements of lever 80 therefore cause the slider and yoke to shift the compound gear either into mesh with the pinions 68 or the gears 70 to change the speed range of the transmission. The two positions of this lever are shown in Figure 2.

The lever 91 for shifting the compound gear 85 is substantially a duplicate of lever 80 with the exception that lever 91 has three gear meshing positions instead of two, as in the case of lever 80. As shown in Figures 5 and 9, lever 91 is keyed to a shaft 116 having a gear segment 117 keyed to its inner end in mesh with a rack 118 secured to a slider 120 carried by the rods 114 previously noted. A yoke arm 121 forms a part of slider 120 and engages the gear 89 of the slidable compound gear 85. Shifting movements of lever 91 selectively meshes shiftable gear 90 with gear 84, gear 89 with gear 83 or pinion 88 with gear 81, as previously noted.

The transfer lever 102, which is actuated to convert the transmission from American standard to metric thread cutting, is mounted upon a shaft 122 as shown in Figure 5. The swinging end of lever 102 includes a pin 123 engageable selectively with either of a pair of apertures 124—124 (Figure 3) to lock the lever in a selected position. Pin 123 is screwthreaded into the arm 102 so that it is necessary to unscrew the pin and disengage the stud 125 from the apertures 124 before shifting the arm. The inner end of shaft 122 is provided with a screwthreaded portion 127 which is in screwthreaded engagement with a slider 128 (Figure 7) which is pinned to a slide rod 130. The opposite end of slider 128 carries a pin 131 engaged in a slot in the upper end of the link 101 which is centrally pivoted upon a shoulder screw 132 in screwthreaded engagement with a lug 133 forming a part of the feed box casing. The screwthreaded portion 127 is of multiple pitch so that a partial turn of lever 102 is sufficient to swing the lever 101 a sufficient distance to couple and uncouple alternately the clutches 65 and 65a.

*Tumbler shifting apparatus*

The tumbler unit 57 is shiftable longitudinally in order to mesh with the respective cone gears 62 and is shiftable also transversely in an arc relative to these gears so that a proper meshing engagement between the tumbler gear 58 and the respective gears 62 may be established. As shown in Figure 2, a lever 135 is provided at the front of the feed box for shifting the tumbler in an arc transversely relative to the cone gears 62. This lever swings relative to a sector 136 having a series of apertures 137 engageable by means of a spring loaded plunger 138 mounted in the swinging end of lever 135. Plunger 138 includes a handle 139 at its outer end. A compression spring 140 surrounds the shank of the plunger to urge the same into latching engagement with the apertures 137. The inner end of lever 135 is pinned upon a sleeve 141, the inner end of which includes a gear 142 (Figure 8). Gear 142 meshes with idler 143 journalled upon idler shaft 144 which is mounted in the feed box casing 25. Idler 143 meshes with a gear 145 formed on the hub or a bevel gear 146 which meshes with a bevel gear 147 keyed upon the end of a shaft or elongated gear 148 having its opposite ends journalled as at 150—150 in the casing 25.

As shown in Figures 9 and 10, the tumbler unit 57 constitutes a sector 151 which is provided with a bore having a pair of ball bearings 152—152 to provide a pivotal connection upon the hub 153 of gear 56. The sector is milled out centrally to provide clearance for the gears 56 and 58 and provides a bore to receive the ball bearings 61—61 of idler shaft 60. The upper or swinging end of the sector is provided with gear teeth 157 meshing with the teeth 158 formed lengthwise of shaft 148. It will be apparent therefore, that rotation of the actuating lever 135 toward the left will drive the shaft 148 in an appropriate direction to cause the tumbler unit 57 to swing to the right as viewed in Figure 9 so that gear 58 swings clear of the largest gear on cone 63. It will be noted in Figure 9 that the sector is mounted in a vertical position upon its splined mounting shaft 54, substantially in a balanced condition. This reduces materially the effort exerted by the operator in shifting the sector because it swings relative to a neutral or balanced position with most of its weight imposed on shaft 54.

It will be noted also, that there is a set of ten gears 62 in the cone gear and that there are ten apertures 137 in the sector 136. These apertures lock the gear 58 in proper meshing engagement with the cone gears 62. A notched rod 159 cooperates with a lug 160 formed on the sector to prevent longitudinal displacement of the sector when it is in mesh. It will be understood that before shifting the tumbler unit longitudinally into alignment with the selected cone gear 62, that it is necessary to swing lever 135 completely to the left as shown in broken lines in Figure 2 in order that the tumbler gear 58 is clear of the cone gears 62 and the lug 160 out of engagement with the notched rod.

The cone gear selection is made by rotating selector 161 in the appropriate direction. The selector is secured by a set screw 162 to a shaft 163 which is loosely journalled in the sleeve 141 of the gear 142 (Figure 8). By this arrangement, the selector 161 may be moved independently of the lever 135. The outer end of the selector 161 includes a pair of knobs 165—165 to provide a convenient hand hold. Upon the inner end of shaft 163 is keyed a gear 166 meshing with an idler 167 which in turn meshes with a rack 168. Rack 168 forms a part of a slider unit 169 (Figure 5) mounted upon slide rods 170—170. As shown in Figures 5 and 9, the slider includes a bifurcated yoke 171 engaging the opposite sides of the tumbler unit 57 at the pivoted end of the tumbler to prevent binding of the tumbler on its shaft 54. It will be apparent therefore, that rotation of the selector 161 will shift the tumbler unit longitudinally relative to the cone gears 62, while the lever 135 is held in its left hand limit of travel to hold the tumbler out of meshing engagement with the cone gears.

After the selection is made, lever 135 is swung toward the right until the tumbler gear 58 meshes with its selected cone gear 62 at which point the plunger 138 drops into engagement with the appropriate apertures 137 and lug 160 engages a notch of rod 159. The selector 161 includes a hub 172 which is preferably graduated to indicate the several speeds and includes a series of detent notches 173 engageable by spring pressed detent 174 (Figure 8) to latch the selector at the desired position. From the foregoing, it will be observed that the gear teeth 157 of the tumbler unit remains constantly in mesh with the elongated teeth, with the shaft 148 when the tumbler is shifted longitudinally. By this arrangement, a smooth, easily controlled connection is maintained between the selectors 135 and 161 and tumbler 57 to provide quick and accurate speed changes.

In the present disclosure the cone 63 provides ten speed changes. By operation of the range control levers 80 and 91, these changes are multiplied by six to provide sixty feed rod and lead screw speed changes. In order to facilitate gear shifting, the apparatus preferably includes a dial plate generally indicated at 175. This plate indicates the proper positioning of the levers 80, 91, 135 and 161 to obtain the proper feed rate for the various threads so that the indications of the respective dials are properly correlated and the levers may quickly and conveniently be set. These speeds provide carriage travel either in thousandths of an inch or in millimeters as determined by the conversion mechanism so that the apparatus may quickly be set up for the proper operation.

Having described my invention, I claim:

1. In a feed box for a lathe carriage or the like having shiftable gears adapted to provide a series of speed ranges, a pair of parallel shafts, selective means for driving one of said shafts, a cone of gears fixed on one of said shafts, a slidable tumbler gear unit pivotally mounted upon the other of said shafts, and having a gear splined to said shaft, a lever having a rotative connection with said tumbler gear for swinging the same into and out of mesh with the respective gears of the cone, a knob disposed adjacent to the lever and mounted upon a common axis therewith, a gear train in connection with said knob, a rod having a rack meshing with said gear train, a slider on said rod and a shifter fork mounted on said slider and engaged with said tumbler gear unit for shifting the tumbler unit longitudinally relative to said cone of gears when said knob is rotated.

2. In a feed box transmission for a lathe or the like having shiftable gears adapted to provide a series of speed ranges, a pair of parallel shafts, driving means connected to one of said shafts, a cone of gears fixed to one of said shafts, a tumbler gear unit slidably mounted on the other of said shafts in driving connection therewith and adapted to pivot relative to the shaft to mesh with the respective gears of said cone of gears, an actuating shaft having continuous gear teeth running lengthwise thereof and parallel with said tumbler gear mounting shaft, a series of gear teeth formed in the swinging end of said tumbler gear unit, said teeth being in mesh with the teeth of said shaft to swing said tumbler gear unit in an arc relative to said cone of gears, an actuating handle including a gear train connected to said actuating shaft for controlling the swinging movements of said tumbler gear unit, a selector knob mounted on the axis of said actuating lever and including a train of gears, a yoke engaging the swinging end of said tumbler gear unit adjacent to its mounting shaft, and connecting means extending from said yoke to the gear train of said selector knob operable to shift said tumbler gear unit longitudinally relative to said cone of gears when said selector knob is rotated.

3. In a transmission having shiftable gears adapted to provide a series of speed ranges, a pair of parallel shafts, driving means connected to one of said shafts, a series of gears fixed to one of said shafts, a tumbler gear unit mounted in a substantially balanced upright position having its lower end slidably mounted on the other of said shafts in driving connection therewith and adapted to pivot relative to said shaft, gear teeth formed in the upper swinging end of said tumbler gear unit, an elongated gear coextensive with said series of gears in mesh with the teeth of the tumbler gear unit to establish a slidable driving engagement therewith, a pivotally mounted control member, a gear train extending from the control member to said elongated gear operable to rotate the elongated gear and thereby swing said tumbler unit into and out of mesh with the respective gears of said series, a second control member for shifting the tumbler unit longitudinally relative to said gears, the second control member being mounted for rotation upon the pivotal axis of the first mentioned control member, a gear train in driving connection with said second control member, a yoke for shifting said tumbler gear unit, said yoke having a bifurcated end in engagement with the tumbler gear unit at an end opposite to the swinging end thereof and closely adjacent to the mounting shaft, and a rack connected to said yoke and in mesh with the gear train of said second control member to shift the yoke and tumbler gear unit longitudinally relative to said series of gears to mesh with a selected gear of the cone upon rotation of said second control member.

WILLIAM G. HOELSCHER.

References Cited in the file of this patent

UNITED STATES PATENTS

| Number | Name | Date |
|---|---|---|
| 1,019,798 | Kearney et al. | Mar. 12, 1912 |
| 1,285,399 | Runge | Nov. 19, 1918 |
| 1,422,098 | Greenleaf et al. | July 11, 1922 |
| 1,628,598 | Bird | May 10, 1927 |
| 1,732,561 | Kearney et al. | Oct. 22, 1929 |
| 1,982,612 | Hoelscher | Nov. 27, 1934 |
| 2,199,834 | Groene et al. | May 7, 1940 |
| 2,274,958 | Hautsch | Mar. 3, 1942 |
| 2,447,317 | Davenport | Aug. 17, 1948 |

FOREIGN PATENTS

| Number | Country | Date |
|---|---|---|
| 236,640 | Switzerland | Feb. 28, 1945 |